US012699630B2

(12) United States Patent
    Zlotnik et al.

(10) Patent No.:     US 12,699,630 B2
(45) Date of Patent:         Aug. 4, 2026

(54) SYNDROME CALCULATION

(71) Applicant: Micron Technology, Inc., Boise, ID (US)

(72) Inventors: Leon Zlotnik, Camino, CA (US); Eyal En Gad, Highland, CA (US)

(73) Assignee: Micron Technology, Inc., Boise, ID (US)

( * ) Notice: Subject to any disclaimer, the term of this patent is extended or adjusted under 35 U.S.C. 154(b) by 8 days.

(21) Appl. No.: 18/913,708

(22) Filed: Oct. 11, 2024

(65)              Prior Publication Data

US 2025/0156271 A1      May 15, 2025

Related U.S. Application Data

(60) Provisional application No. 63/599,315, filed on Nov. 15, 2023.

(51) Int. Cl.
    G06F 11/10          (2006.01)
(52) U.S. Cl.
    CPC ........ G06F 11/1068 (2013.01); G06F 11/106 (2013.01)
(58) Field of Classification Search
    CPC ..... G06F 11/1068; G06F 11/106; G11C 29/38

USPC ......................................................... 714/764
See application file for complete search history.

(56)              References Cited

U.S. PATENT DOCUMENTS

| | | | | |
|---|---|---|---|---|
| 11,789,818 B2* | 10/2023 | Schaefer | ............. | G06F 11/1076 |
| | | | | 714/755 |
| 2004/0153902 A1* | 8/2004 | Machado | ............ | G06F 11/1068 |
| | | | | 714/E11.038 |
| 2008/0244363 A1* | 10/2008 | Yu | ..................... | H03M 13/1515 |
| | | | | 714/784 |
| 2024/0146335 A1* | 5/2024 | Kim | ........................ | G11C 29/42 |

FOREIGN PATENT DOCUMENTS

CN              116107798 A   *   5/2023   ........ H03M 13/1575

* cited by examiner

*Primary Examiner* — Albert Decady
*Assistant Examiner* — Enam Ahmed
(74) *Attorney, Agent, or Firm* — Brooks, Cameron & Huebsch, PLLC

(57)              ABSTRACT

A syndrome can be calculated by storing data in a first array of memory cells and calculating syndromes utilizing the data, a first circuitry, and the first array of memory cells. The syndromes can be copied to a second array of memory cells. A decoding operation can be performed utilizing the plurality of syndromes, the second array of memory cells, and a second circuitry, where the first circuitry and the second circuitry are independent from each other.

19 Claims, 5 Drawing Sheets

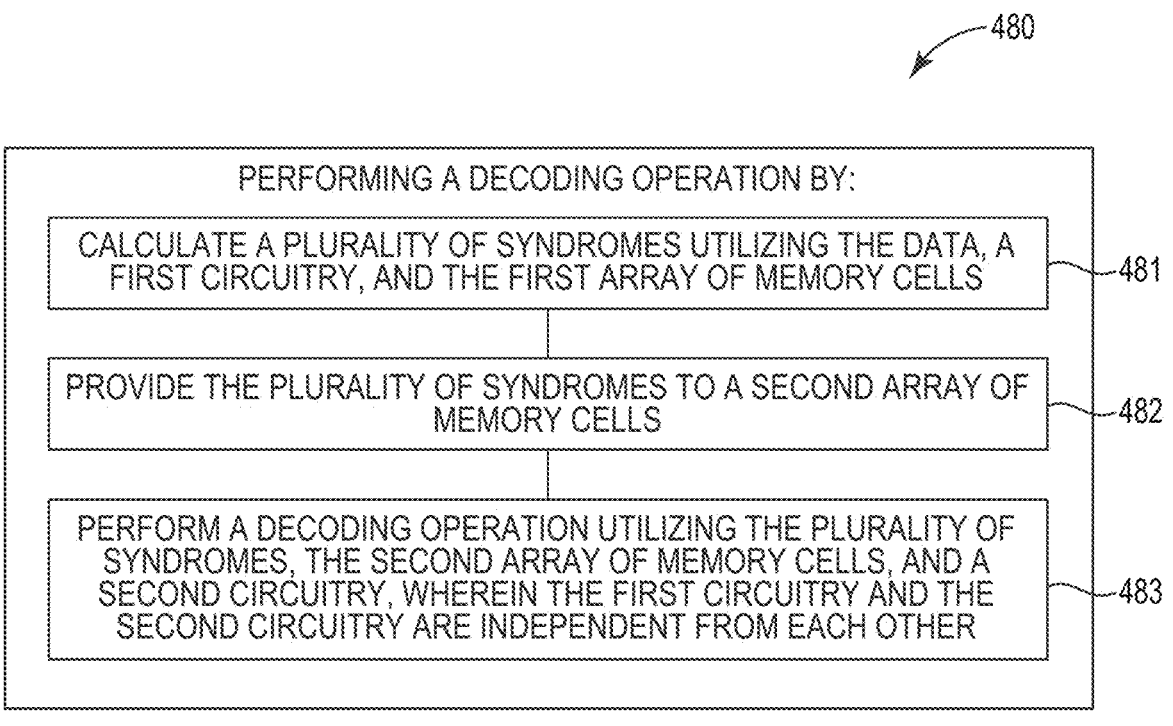

PERFORMING A DECODING OPERATION BY:

CALCULATE A PLURALITY OF SYNDROMES UTILIZING THE DATA, A FIRST CIRCUITRY, AND THE FIRST ARRAY OF MEMORY CELLS —481

PROVIDE THE PLURALITY OF SYNDROMES TO A SECOND ARRAY OF MEMORY CELLS —482

PERFORM A DECODING OPERATION UTILIZING THE PLURALITY OF SYNDROMES, THE SECOND ARRAY OF MEMORY CELLS, AND A SECOND CIRCUITRY, WHEREIN THE FIRST CIRCUITRY AND THE SECOND CIRCUITRY ARE INDEPENDENT FROM EACH OTHER —483

FIG. 4

SYNDROME CALCULATION

PRIORITY INFORMATION

This application claims the benefit of U.S. Provisional Application No. 63/599,315, filed on Nov. 15, 2023, the contents of which are incorporated herein by reference.

TECHNICAL FIELD

Embodiments of the disclosure relate generally to calculating a syndrome, and more specifically, relate to implementing syndrome calculation circuitry, that is different from a decoding circuitry to calculate a syndrome.

BACKGROUND

Various types of electronic devices such as digital logic circuits and memory systems may store and process data. A digital logic circuit is an electronic circuit that processes digital signals or binary information, which can take on two possible values (usually represented as 0 and 1). The digital logic circuit can use logic gates to manipulate and transform the digital signals or binary information. Digital logic circuits can be, for example, used in a wide range of electronic devices including computers, calculators, digital clocks, and many other electronic devices that employ digital processing. Digital logic circuits can be designed to perform specific logical operations on digital inputs to generate digital outputs, and, in some instances, can be combined to form more complex circuits to perform more complex operations. A memory device can include one or more memory devices that store data. The memory devices can be, for example, non-volatile memory devices and volatile memory devices. In general, a host system can utilize a memory system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

FIG. 4 is a flow diagram corresponding to a method for calculating a syndrome in accordance with some embodiments of the present disclosure.

DETAILED DESCRIPTION

Figure 1:
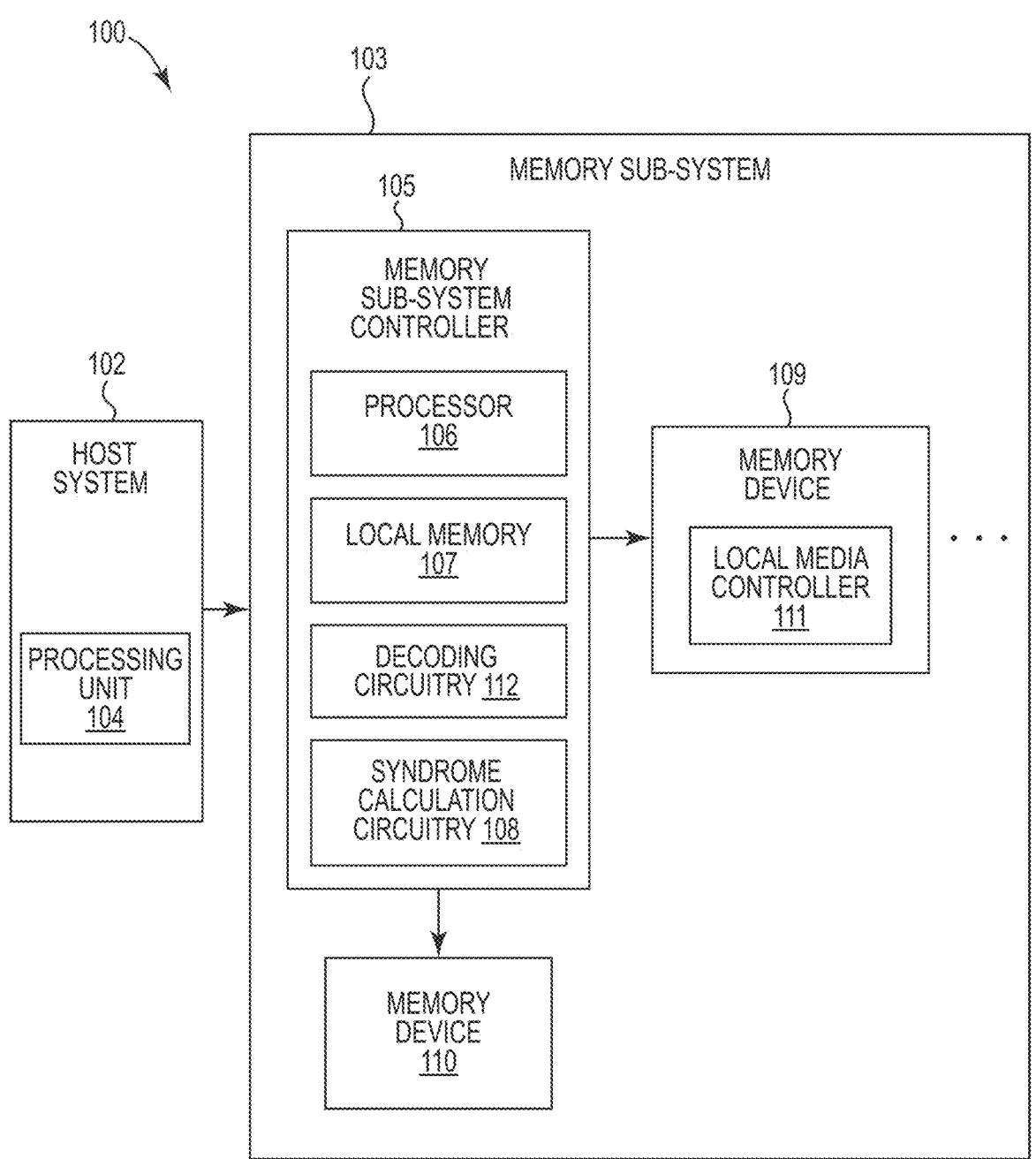
FIG. 1 illustrates an example computing system that includes a memory sub-system in accordance with some embodiments of the present disclosure.

Aspects of the present disclosure are directed to syndrome calculation. In some embodiments, a decoder can perform decoding operations and, in particular, decoding operations performed within a memory sub-system. The decoder may utilize one or more syndromes to perform the decoding operations. A memory sub-system can be a storage system, storage device, a memory module, or a combination of such. An example of a memory sub-system is a storage system such as a solid-state drive (SSD). Examples of storage devices and memory modules are described below in conjunction with FIG. 1, et alibi. In general, a host system can utilize a memory sub-system that includes one or more components, such as memory devices that store data. The host system can provide data to be stored at the memory sub-system and can request data to be retrieved from the memory sub-system.

Although some non-limiting examples herein are generally described in terms of applicability to memory sub-systems and/or to memory devices, embodiments are not so limited, and aspects of the present disclosure can be applied as well to a system-on-a-chip, computing sub-system, data collection and processing, storage, networking, communication, power, artificial intelligence, control, telemetry, sensing and monitoring, digital entertainment and other types of systems/sub-systems and/or devices. Accordingly, aspects of the present disclosure can be applied to these components in order to calculate a syndrome, as described herein. As used herein, a syndrome is a set of measurements or values that are used to determine the presence or location of errors in a bit string (e.g., codeword). As used herein, a codeword is an encoded bit string. The codeword can be described as a bit string and the decoded codeword can be described as a decoded bit string.

Data can be written to and stored by one or more digital logic circuits and/or memory systems. The data (e.g., one or more codewords that can correspond to, for example, user data) can be encoded prior to being transferred to the memory device(s) and/or prior to being written to (e.g., stored) by the memory device(s). Upon retrieval of the data, the data is generally decoded. There are many techniques for decoding of codewords, some non-limiting examples of which include maximum likelihood decoding, minimum distance decoding (e.g., decoding techniques that seek to minimize a Hamming distance associated with a codeword), list decoding, linear decoding, bit-flip decoding, and/or information set decoding, among others.

As will be appreciated such decoding techniques can be employed to detect bit errors in data (e.g., codewords) based on determining that bits associated with the data have incorrect states (e.g., a "1" where a "0" should be and vice versa). Some of the more common decoding techniques employed include Hamming codes, Reed-Solomon (RS) codes, Bose-Chaudhuri-Hochquenghem (BCH) codes, circular redundancy check (CRC) codes, Golay codes, Reed-Muller codes, Goppa codes, neighbor-cell assisted error correction codes, low-density parity-check (LDPC) error correction codes, Denniston codes, and syndrome decoding, among others. While each of these decoding techniques enjoy their own benefits, they also can experience various drawbacks. For example, more accurate decoding techniques tend to consume more power and/or time, while less accurate decoding techniques may be performed faster and may consume less power. In the interest of clarity, the present disclosure will be described in terms of linear codes, such as LDPC codes and/or syndrome decoding, which may be generally referred to herein as "decoding techniques," given the context of the disclosure; however, it will be appreciated that the techniques described herein apply to other decoding techniques as well.

In some approaches decoding of bit strings and/or syndromes is achieved by processing the bit strings and/or syndromes through a series of flip-flops (which can include thousands of flip-flops) and applying a logical operation (e.g., logical AND, OR, XOR operations, etc.) to the bit strings and/or syndromes. In such approaches, the quantity of inputs of the logical operation is generally equal to the quantity of flip-flops used to process the bit strings and/or syndromes. If performance of the logical operation returns a particular value (e.g., a logical value of "1" in the case of a logical AND operation), the bit strings and/or syndromes are considered to be decoded.

The decoding of a bit string can include the calculation of syndromes. The syndromes can be calculated prior to performing a plurality of iterations of a decoding operation. The increase of the quantity of iterations utilized to decode a bit string can reduce the throughput of the generation of the decoded bit string. For example, if four iterations are utilized to decode a bit string, then the total iterations utilized to decode a bit strigs can be five iterations when considering an iteration (e.g., "zero iteration") to calculate the syndromes and the four iterations utilized to decode the bit string. If after four iterations the decoder begins to suffer a drop in performance, then the zero iteration utilized to calculate the syndromes can limit the iterations available for performing the decoding operation prior to the loss of performance. It may be inefficient to utilize an iteration to calculate the syndrome if it can be avoided. Additionally, the bit string can be read from a memory device. The memory can be read twice. The memory can be read for the first time to calculate a syndrome. The memory can be read a second time to perform a decoding operation. Reading the bit string can consume power and time. For example, the time consumed in reading the bit string can be utilized to perform the decoding iterations.

In order to address these and other deficiencies of current approaches, embodiments of the present disclosure allow for syndromes to be calculated concurrently with a performance of a number of iterations of a decoding operation and allow for the bit string to be accessed as the bit string is stored to a memory device. Reading the bit string prior to the bit string being stored in the memory device and calculating the syndromes can be referred to as calculating the syndromes on the "fly". The bit string can be accessed as the bit string is stored to the memory device instead of reading the bit string from the memory device to access the bit string. Accessing the bit string (e.g., intercepting the bit string) instead of reading the bit string from the memory device can save the energy cost and time associated with reading the bit string from the memory device. The bit string can be accessed without reading the bit string from the memory device.

In various instances, a new syndrome can be calculated utilizing a first circuitry while a second circuitry decodes a previous bit string utilizing a previous syndrome. Concurrently calculating syndromes with the performance of decoding operations can allow for a more efficient performance of the decoding operations. The time utilized to calculate syndromes prior to decoding bit strings can be utilized to concurrently calculate syndromes and decode bit strings which can increase the efficiency of the decoding of the bit string. The syndromes can be calculated concurrently with the decoding of the bit string utilizing a first circuitry to calculate the syndrome and a second circuitry to decode the bit string. The implementation of the first circuitry can incur an additional expense (e.g., cost and area) as opposed to using the same circuitry to calculate the syndromes and decode the bit string. The additional expense can be offset by the efficiency increase experienced by calculating the syndrome in circuitry that is different from the circuitry utilized to decode the bit string.

FIG. 1 illustrates an example computing system 100 that includes a memory sub-system 103 in accordance with some embodiments of the present disclosure. The memory sub-system 103 can include media, such as one or more volatile memory devices (e.g., memory device 110), one or more non-volatile memory devices (e.g., memory device 109), or a combination of such.

A memory sub-system 103 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

In other embodiments, the computing system 100 can be deployed on, or otherwise included in a computing device such as a desktop computer, laptop computer, server, network server, mobile computing device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device. As used herein, the term "mobile computing device" generally refers to a handheld computing device that has a slate or phablet form factor. For example, a mobile computing device can include a mobile phone, a tablet, an entertainment device, a gaming device, a navigation device, a photo/video camera etc. In general, a slate form factor can include a display screen that is between approximately 3 inches and 5.2 inches (measured diagonally), while a phablet form factor can include a display screen that is between approximately 5.2 inches and 7 inches (measured diagonally). Examples of "mobile computing devices" are not so limited, however, and in some embodiments, a "mobile computing device" can refer to an IoT device, among other types of edge computing devices.

The computing system 100 can include a host system 102 that is coupled to one or more memory sub-systems 103. In some embodiments, the host system 102 is coupled to different types of memory sub-system 103. FIG. 1 illustrates one example of a host system 102 coupled to one memory sub-system 103. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 102 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 102 uses the memory sub-system 103, for example, to write data to the memory sub-system 103 and read data from the memory sub-system 103.

The host system 102 includes a processing unit 104. The processing unit 104 can be a central processing unit (CPU) that is configured to execute an operating system. In some embodiments, the processing unit 104 comprises a complex instruction set computer architecture, such an x86 or other architecture suitable for use as a CPU for a host system 102.

The host system 102 can be coupled to the memory sub-system 103 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 102 and the memory sub-system 103. The host system 102 can further utilize an NVM Express (NVMe) interface to access components (e.g., memory devices 109) when the memory sub-system 103 is coupled with the host system 102 by the PCIe interface. The physical host interface can provide an interface for passing control, address, data, and other signals between the memory sub-system 103 and the host system 102. FIG. 1 illustrates a memory sub-system 103 as an example. In general, the host system 102 can access multiple memory sub-systems via the same communication connection, multiple separate communication connections, and/or a combination of communication connections.

The memory devices 109, 110 can include any combination of the different types of non-volatile memory devices and/or volatile memory devices. The volatile memory devices (e.g., memory device 110) can be, but are not limited to, random access memory (RAM), such as dynamic random-access memory (DRAM) and synchronous dynamic random access memory (SDRAM).

Some examples of non-volatile memory devices (e.g., memory device 109) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 109, 110 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLC) can store multiple bits per cell. In some embodiments, each of the memory devices 109 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 109 can be grouped as pages that can refer to a logical unit of the memory device used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the memory device 109 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 105 (or controller 105 for simplicity) can communicate with the memory devices 109 to perform operations such as reading data, writing data, or erasing data at the memory devices 109 and other such operations. The memory sub-system controller 105 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 105 can be a microcontroller, special purpose logic circuitry (e.g., a field programmable gate array (FPGA), an application specific integrated circuit (ASIC), etc.), or other suitable processor.

The memory sub-system controller 105 can include a processor 106 (e.g., a processing device) configured to execute instructions stored in a local memory 107. In the illustrated example, the local memory 107 of the memory sub-system controller 105 includes an embedded memory configured to store instructions for performing various processes, operations, logic flows, and routines that control operation of the memory sub-system 103, including handling communications between the memory sub-system 103 and the host system 102.

In some embodiments, the local memory 107 can include memory registers storing memory pointers, fetched data, etc. The local memory 107 can also include read-only memory (ROM) for storing micro-code. While the example memory sub-system 103 in FIG. 1 has been illustrated as including the memory sub-system controller 105, in another embodiment of the present disclosure, a memory sub-system 103 does not include a memory sub-system controller 105, and can instead rely upon external control (e.g., provided by an external host, or by a processor or controller separate from the memory sub-system).

In general, the memory sub-system controller 105 can receive commands or operations from the host system 102 and can convert the commands or operations into instructions or appropriate commands to achieve the desired access to the memory device 109 and/or the memory device 110. The memory sub-system controller 105 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 109. The memory sub-system controller 105 can further include host interface circuitry to communicate with the host system 102 via the physical host interface. The host interface circuitry can convert the commands received from the host system into command instructions to access the memory device 109 and/or the memory device 110 as well as convert responses associated with the memory device 109 and/or the memory device 110 into information for the host system 102.

The memory sub-system 103 can also include additional circuitry or components that are not illustrated. In some embodiments, the memory sub-system 103 can include a cache or buffer (e.g., DRAM) and address circuitry (e.g., a row decoder and a column decoder) that can receive an address from the memory sub-system controller 105 and decode the address to access the memory device 109 and/or the memory device 110.

In some embodiments, the memory device 109 includes local media controllers 111 that operate in conjunction with memory sub-system controller 105 to execute operations on one or more memory cells of the memory devices 109. An external controller (e.g., memory sub-system controller 105) can externally manage the memory device 109 (e.g., perform media management operations on the memory device 109). In some embodiments, a memory device 109 is a managed memory device, which is a raw memory device combined with a local controller (e.g., local controller 111) for media management within the same memory device package. An example of a managed memory device is a managed NAND (MNAND) device.

The memory sub-system 103 can include syndrome calculation circuitry 108. Although not shown in FIG. 1 so as to not obfuscate the drawings, the syndrome calculation circuitry 108 can include various circuitry to facilitate aspects of the disclosure described herein in FIG. 2 and FIG. 3. In some embodiments, the syndrome calculation circuitry 108 can include special purpose circuitry in the form of an ASIC, FPGA, state machine, hardware processing device, and/or other logic circuitry that can allow the syndrome calculation circuitry 108 to orchestrate and/or perform a calculation of syndromes, particularly with respect to a system-on-chip, in accordance with the disclosure. The syndrome calculation circuitry 108 can be separate from decoding circuitry 112 as shown in FIG. 1. In other examples, the syndrome calculation circuitry 108 can be part of the decoding circuitry 112.

In some embodiments, the memory sub-system controller 105 includes at least a portion of the syndrome calculation circuitry 108. For example, the memory sub-system controller 105 can include a processor 106 (processing device) configured to execute instructions stored in local memory 107 for performing the operations described herein. In some embodiments, the syndrome calculation circuitry 108 is part of the host system 103, an application, or an operating system. The syndrome calculation circuitry 108 can be resident on the memory sub-system 103 and/or the memory sub-system controller 105. As used herein, the term "resident on" refers to something that is physically located on a particular component. For example, the syndrome calculation circuitry 108 being "resident on" the memory sub-system 103 refers to a condition in which the hardware circuitry that comprises the syndrome calculation circuitry 108 is physically located on the memory sub-system 103. The term "resident on" may be used interchangeably with other terms such as "deployed on" or "located on," herein.

The syndrome calculation circuitry 108 can include an array of memory cells utilized for the calculation of syndromes. In various instances, the syndrome calculation circuitry 108 can be a simplified version of the decoding circuitry 112. A difference between the decoding circuitry 112 and the syndrome calculation circuitry 108 is that the syndrome calculation circuitry 108 may not include a decision engine while the decoding circuitry 112 includes one or more decision engines. As used herein, the decision engine is a processing device which performs a number of decoding operations utilizing the syndromes and the codeword. The syndrome calculation circuitry 108, in addition to not being coupled to or having a decision engine, may not be connected to other portions of the decoding circuitry 112 such as a correction (CR) memory. As used herein, the CR memory is an array of memory cells, an array of flip-flops, and/or latches that stores a correction matrix. A correction matrix can be utilized to identify which of the bits of a codeword were updated in a last iteration of a decoding operation.

The syndrome calculation circuitry 108 can calculate the syndrome on the fly by accessing a codeword prior to the codeword being stored in a memory device accessible to the syndrome calculation circuitry 108. The memory accessible to the syndrome calculation circuitry 108 can be part of the decoding circuitry 112 and/or the memory sub-system controller 105. The syndrome calculation circuitry 108 can be utilized to calculate syndromes without performing a read operation to the memory device accessible to the syndrome calculation circuitry 108. Accessing a codeword without reading the codeword from a memory device accessible to the syndrome calculation circuitry 108 and/or the decoding circuitry 112 can utilize less resources than reading the codeword from the memory device accessible to the syndrome calculation circuitry 108 and/or the decoding circuitry 112. In various instances, the syndrome calculation circuitry 108 can be simpler than the decoding circuitry 112 given that the syndrome calculation circuitry 108 can calculate the syndromes without parallelism using multiple channels and without being subject to multi-channel collisions. The syndrome calculation circuitry 108 can calculate the syndromes with less timing requirements than the decoding circuitry 112.

Figure 2:
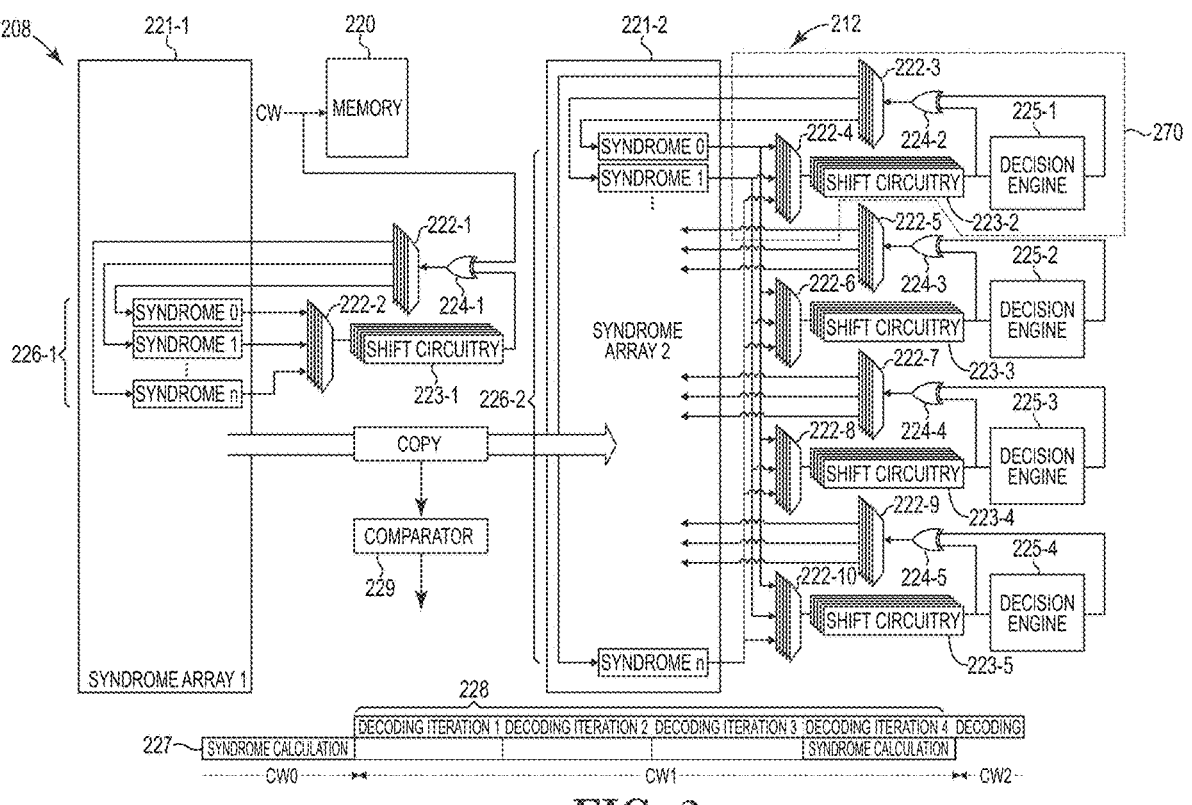
FIG. 2 illustrates an example of syndrome calculation circuitry in accordance with some embodiments of the present disclosure.

FIG. 2 illustrates an example of syndrome calculation circuitry 208 in accordance with some embodiments of the present disclosure. FIG. 2 includes the syndrome calculation circuitry 208 and the decoding circuitry 212 as separate circuitry. The syndrome calculation circuitry 208 includes an array 221-1 of memory cells, de-multiplexor (de-MUX) gates 222-1, and MUX gates 222-2, shift circuitry 223-1, and an XOR gates 224-1 (e.g., a logic gate). The decoding circuitry 212 includes an array 221-2 of memory cells, MUX gates 222-4, 222-6, 222-8, 222-10, de-MUX gates 222-3, 222-5, 222-7, 222-9, shift circuitry 223-2, 223-3, 223-4, 223-5, XOR gates 224-2, 224-3, 224-4, 224-5, and decision engines 225-1, 225-2, 225-3, 225-4.

The arrays 221-1, 221-2, referred to as arrays 221, can be custom multiple memory given that the arrays 221 can be read from multiple ports and can be written through multiple ports. The arrays 221-1, 221-1 can also be implemented using flip flops or latches. The arrays 221 store syndromes 226-1, 226-2. The arrays 221 can store the syndromes 226-1, 226-2 as syndrome words (e.g., syndrome 0, syndrome 1, . . . , syndrome n). Each of the syndrome words can include multiple bits. The syndrome calculation circuitry 208 can access a codeword as the codeword is stored in the memory device 220.

Figure 3:
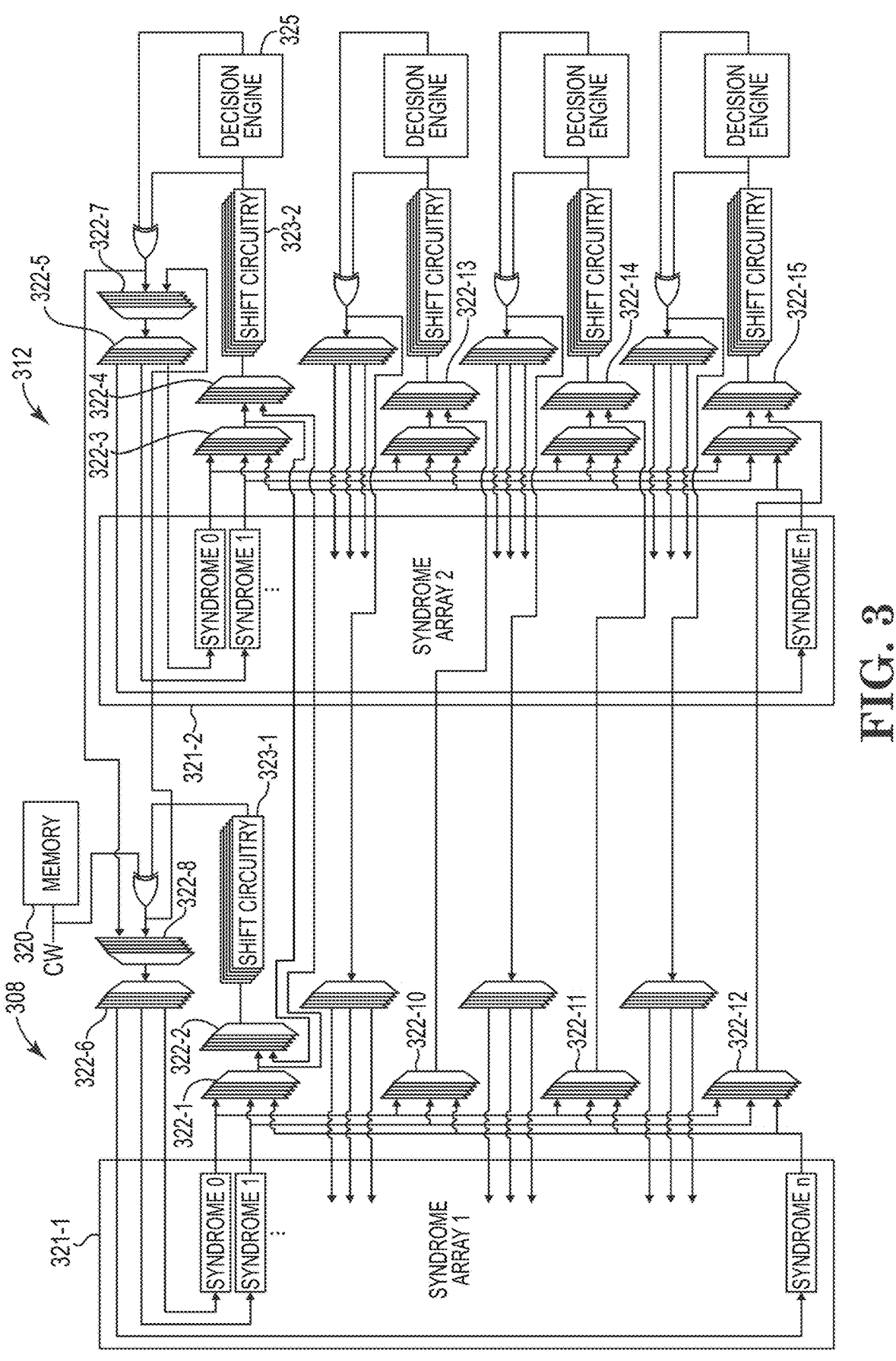
FIG. 3 illustrates an example of syndrome calculation circuitry and decoding circuitry in accordance with some embodiments of the present disclosure.

Although not explicitly shown in FIG. 2 and FIG. 3, one or more of the components illustrated can be one of a plurality of such components. For example, each of the MUX gates 222-2, 222-4, 222-6, 222-8, 222-10 can include multiple MUX gates (e.g., 16, 32, 128, etc.) and each of the de-MUX gates 222-1, 222-3, 222-5, 222-7, 222-9 can include multiple de-MUX gates even though a single MUX gate/de-MUX gate is shown for each of the MUX gates 222-2, 222-4, 222-6, 222-8, 222-10 and each of the de-MUX gates 222-1, 222-3, 222-5, 222-7, 222-9.

As used herein, the term "codeword" generally refers to a data word having a specified size (e.g., 4 KB, etc.) that is encoded such that the codeword can be individually protected by some error encoding and/or decoding scheme. For example, a "codeword" can refer to a set of bits (e.g., a bit string) that can be individually encoded and/or decoded.

The array 221-1 is coupled to the MUX gates 222-2 that are configured to selectively transfer one or more of the bit strings and/or syndromes 226-1 to shift circuitry 223-1. In some embodiments, the shift circuitry 223-1 can comprise a barrel shifter that is configured to shift the bit strings and/or syndromes 226-1 by a specified number of bits. The shift circuitry 223-1 can shift the bit strings and/or syndromes 226-1 by a specified number of bits using pure combinatorial logic. Embodiments are not so limited, however, and it is contemplated within the disclosure that the shift circuitry 223-1 can be configured to perform shift operations involving the bit strings and/or syndromes 226-1 utilizing other combinatorial logic techniques (e.g., circular shifting, etc.) and/or sequential logic techniques.

The output of the shift circuitry 223-1 can be provided to the XOR gate 224-1. Although the gate 224-1 is shown as an XOR gate, the embodiments described herein are not limited to an XOR gate and can include the use of other logic gates (e.g., AND gates, OR gates, NOR gates, NOT gates, etc.). The syndromes 226-1 processed by the shift circuitry 223-1 are received as inputs by the XOR gate 224-1 and a logical XOR operation is performed thereon. As will be appreciated, if the result of the logical XOR operation returns a value of zero, then the codeword is decoded and no additional decoding needs to be performed on the codeword. If the result of the logical XOR operation returns a value of zero, then the decoding is classified as successful even though the decoder 212 does not receive the syndromes. In response to determining that the syndromes 226-1 have been successfully calculated, an indication that the syndromes 226-1 have been successfully calculated is written to the array 221-1. It will be appreciated that the syndromes 226-1, 226-2 generally reflects a current error state associated with data contained within the bit string (e.g., codeword) and, once the value of the syndromes have reached zero, it implies that the bit string has been decoded. After each iteration, the calculated syndromes 226-1 can be stored back to the array 221-1.

The syndromes 226-1 can be copied from the array 221-1 to the array 221-2. The array 221-2 can be part of a decoding circuitry 212. The decoding circuitry 212 can store the received syndromes 226-1 in the array 221-2. The syndromes stored in the array 221-2 can be referred to as the syndromes 221-2. The syndromes 226-1, 226-2 can be the same syndromes after the syndromes 221-1 are copied to the array 221-2 but before the decoding operations are performed utilizing the syndromes 221-2. After copying the syndromes 221-1 to the array 221-2, the syndromes 221-2 are utilized in a number of iterations to decode a codeword. After copying the syndromes 221-1 to the array 221-2, new syndromes are calculated on the fly utilizing the array 221-1.

Although the examples described herein are provided in terms of copying the syndromes from the array 221-1 to the array 221-2, the syndromes can be made available to the array 221-2 in a variety of ways. For example, the array 221-2 can access (e.g., read) the syndromes from the array 221-1 instead of the array 221-1 copying the syndromes to the array 221-2.

The decoding circuitry 212 can include multiple channels 270. For example, FIG. 2 shows the decoding circuitry 212 as including four channels 270. Each of the channels 270 includes MUX gates, de-MUX gates, shift circuitry, a decision engine, and a logic gate. For instance, a first channel of the decoding circuitry 212 includes the de-MUX gates 222-3, MUX gates 222-4, the shift circuitry 223-2, the decision engine 225-1, and the XOR gate 224-2. Each of the MUXs 222-2, 222-4, 222-6, 222-8, 222-10, the de-MUXs 222-1, 222-3, 222-5, 222-7, 222-9, the shift circuitry 223-1, 223-2, 223-3, 223-4, 223-5, and the logic gates 224-1, 224-2, 224-3, 224-4, 224-5 include five layers. Given that a channel includes a block of MUXs (e.g., 5 layers of MUX), de-MUXs (e.g., 5 layers of de-MUX), shift circuitry (e.g., 5 layers of shift circuitry), and logic gates (e.g., 5 layers of logic gates), each channel includes 5 layers. The channels (e.g., 4 channels) of the decoding circuitry 212 together can include 20 layers. Although five layers are utilized, more or less than those shown herein can be utilized. Although the examples provided herein show decoding circuitry comprising four channels 270, the examples described herein are applicable to decoding circuitry 212 having a different number of channels and/or columns. The quantity of channels and/or columns of the decoding circuitry 212 allow the decoding circuitry 212 to decode a codeword utilizing the syndromes 226-2 in parallel. Having more than one channel allows parallel processing. With four channels instead of one, the processing can take 75 clocks instead of 300 clocks, for example.

The shift circuitry 223-2, 223-3, 223-4, 223-5 is coupled to decision engines 225-1, 225-2, 225-3, 225-4. The decision engines 225-1, 225-2, 225-3, 225-4 include hardware circuitry that is configured to correct erroneous bits (e.g., bit-flip errors) in the bit strings and/or syndromes 226-2. In some embodiments, the decision engines 225-1, 225-2, 225-3, 225-4 can cause one or more bits in the bit strings and/or syndromes 226-2 to be flipped based on a determined probability that such bits are erroneous. The probability that one or more bits in the bit strings and/or syndromes 226-2 is to be flipped can be determined using various linear codes, such as syndrome decoding codes, LDPC codes, etc. Embodiments are not limited to cases in which the decision engines 225-1, 225-2, 225-3, 225-4 cause one or more bits in the bit strings and/or syndromes 226-2 to be flipped based on a determined probability that such bits are erroneous (e.g., through the use of a linear decoding technique), however, and in some embodiments, the decision engines 225-1, 225-2, 225-3, 225-4 can determine which bits of the bit strings and/or syndromes 226-2 are erroneous based on mathematical inference algorithms, machine learning algorithms, and/or other suitable techniques for determining which bits of the bit strings and/or syndromes 226-2 are erroneous.

In the example of FIG. 2 the decoding of the codeword can take up to four iterations 228 (e.g., decoding iterations) before the throughput of the decoding circuitry 212 begins to decrease. For instance, the decoding of a codeword can take less than four iterations 228 but the performance of the decoding circuitry 212 (e.g., throughput) would not increase because a next codeword is available every four iterations 228. If the decoding of the codeword takes more than four iterations 228, the performance of the decoding circuitry 212 can decrease given that the next codeword received after the fourth iteration is not processed until the decoding circuitry 212 finishes the decoding of the codeword.

However, utilizing an iteration (e.g., zero iteration) to calculate 227 the syndromes can reduce the iterations 228 available for decoding a codeword. The syndrome calculation circuitry 208 is separate from the decoding circuitry 212 which allows it to calculate 227 the syndromes independently of the decoding of codewords by the decoding circuitry 212. For example, the syndrome calculation circuitry 208 can calculate next syndromes at a same time (e.g., concurrently) that the decoding circuitry 212 decodes a current codeword.

Although the syndrome calculation circuitry 208 is separate from the decoding circuitry 212, the syndrome calculation circuitry 208 and the decoding circuitry 212 share many similarities. For example, both the syndrome calculation circuitry 208 and the decoding circuitry 212 have arrays, MUX gates, de MUX gates, and shift circuitry. The array 221-1 can be a copy of the array 221-2. For example, the array 221-1 can have a same number of memory cells as the array 221-2. The syndrome calculation circuitry 208 and the decoding circuitry 212 differ in the number of channels that the syndrome calculation circuitry 208 and the decoding circuitry 212 have. The syndrome calculation circuitry 208 can have less channels than the decoding circuitry 212. For instance, the syndrome calculation circuitry 208 has a single channel while the decoding circuitry 212 has multiple channels. Having less channels than the decoding circuitry 212, the syndrome calculation circuitry 208 has less MUX gates, de-MUX gates, shift circuitry, and XOR gates. However, the connectivity between the MUX gates, de-MUX gates, the shifting circuitry, and the XOR gates of the syndrome calculation circuitry 208 is similar to the decoding circuitry 212. Reducing the hardware utilized to implement the syndrome calculating circuitry 208 as compared to the decoding circuitry 212 can reduce the cost utilized to implement the syndrome calculating circuitry 208.

In various instances, the syndrome calculation circuitry 208 and the decoding circuitry 212 can be executed concurrently (e.g., at relatively the same time). For instance, FIG. 2 shows a decoding iteration and a syndrome calculation occurring at relatively the same time.

Although FIG. 2 shows the syndrome calculation and a concurrent decoding of the codeword as occurring in a fourth iteration, the syndrome calculation 227 can occur during any of the iterations 228 of the decoding circuitry 212 or during more than one iteration. The syndrome calculation 227 of syndromes associated with a codeword can occur during a decoding of a different codeword.

Implementing the syndrome calculation circuitry 208 separately from the decoding circuitry 212 allows for a determination to be made as to whether the codeword is likely to be decoded. For instance, the comparator 229 (e.g., hardware and/or firmware) can count the number of 1 bit-values of the syndromes 226-1 and can determine whether to copy the syndromes 226-1 to the array 221-2 based on the comparison of the sum of the 1 bit-values of the syndromes 226-1 to a threshold.

If the quantity of 1 bit-values of the syndromes 226-1 is less than the threshold, the comparator 229 can determine that the codeword is likely to be decodable by the decoding circuitry 212. The comparator 229 can provide the syndromes 226-1 to the array 221-2 based on a determination that the decoding circuitry 212 is likely to be able to decode the codeword.

If the quantity of 1 bit-values of the syndromes 226-1 is greater than the threshold, the comparator 229 can determine that the codeword is unlikely to be decodable by the decoding circuitry 212. The comparator 229 can refrain from providing the syndromes 226-1 to the decoding circuitry 212 responsive to determining that the codeword is unlikely to be decodable by the decoding circuitry 212. The comparator 229 can provide the syndromes 226-1 to a different decoding circuitry that has the resources to decode the syndromes 226-1 responsive to determining that the codeword is unlikely to be decodable by the decoding circuitry 212. The different decoding circuitry may be more suitable for decoding highly corrupted data than the decoding circuitry 212. The different decoding circuitry can be included in the memory sub-system, a host, and/or a different computing device not part of the computing system.

FIG. 3 illustrates an example of syndrome calculation circuitry 308 and decoding circuitry 312 in accordance with some embodiments of the present disclosure. The decoding circuitry 312 can swap arrays with the syndrome calculation circuitry 308. The syndrome calculation circuitry 308 can include an array 321-1 of memory cells and the decoding circuitry 312 can include an array 321-2 of memory cells. The syndrome calculation circuitry 308 includes MUX gates 322-1, 322-2, 322-8, de-MUX gates 322-6, and shift circuitry. The decoding circuitry 312 includes MUX gates 322-3, 322-4, 322-7, de-MUX gates 322-5, shift circuitries, decision engines, and XOR gates. The syndrome calculation circuitry 308 can calculate the next syndromes while the decoding circuitry 312 decodes the current codewords.

For instance, the syndrome calculation circuitry 308 can intercept a codeword as the codeword is stored to the memory device 320. The syndrome calculation circuitry 308, responsive to accessing the codeword, can calculate a plurality of syndromes. The syndrome calculation circuitry 308 can calculate the syndromes utilizing the array 321-1 and the circuitry including the MUX gates 322-1, 322-2, 322-8, de-MUX gates 322-6, the shift circuitry, and the XOR gate. Responsive to calculating the syndromes, the syndrome calculation circuitry 308 and the decoding circuitry 312—can swap arrays.

As used herein, the syndrome calculation circuitry 308 and the decoding circuitry 312 can swap arrays by coupling the array 321-1 to the decoding circuitry 312 and the array 321-2 to the syndrome calculation circuitry 308. For example, each of the de-MUXs (e.g., the de-MUX 322-6) of the syndrome calculation circuitry 308 can receive an output of an XOR gate of the decoding circuitry 312 via the MUX 322-8 of the syndrome calculation circuitry 308. Each of the de-MUXs (e.g., the de-MUX 322-5) of the decoding circuitry 312 can receive an output of an XOR gate of the syndrome calculation circuitry 308 via the MUX 322-7 of the decoding circuitry 312.

Each of outputs of the MUXs 322-1, 322-10, 322-11, 322-12 of the syndrome calculation circuitry 308 can be provided as inputs the MUXs 322-4, 322-13, 322-14, 322-15 of the decoding circuitry 312. The output of the MUX 322-1 can be provided as an input to the MUX 322-4. The output of the MUX 322-10 can be provided as an input to the MUX 322-13. The output of the MUX 322-11 can be provided as an input to the MUX 322-14. The output of the MUX 322-12 can be provided as an input to the MUX 322-15.

The output of the MUX 322-1 can be provided as inputs to the shift circuitry 323-2 utilizing the MUX 322-4. The MUX 322-4 of the decoding circuitry 312 implemented between the MUX 322-3 and the shift circuitry 323-2 of the decoding circuitry 312 can provide an output of the MUX 322-1 of the syndrome calculation circuitry 308 to the shift circuitry 323-2 or an output of the MUX 322-3 to the shift circuitry 323-2.

The outputs of the MUX 322-3 of the decoding circuitry 312 can be provided as inputs to the shift circuitry 323-1 of the syndrome calculation circuitry 308 utilizing MUX 322-2 of the syndrome calculation circuitry 308. The MUX 322-2 of the syndrome calculation circuitry 308 implemented between the MUX 322-1 and the shift circuitry 323-1 of the syndrome calculation circuitry 308 can provide an output of the MUX 322-3 of the decoding circuitry 312 to the shift circuitry 323-1 of the syndrome calculation circuitry 308 or an output of the MUX 322-1 to the shift circuitry 323-1 of the syndrome calculation circuitry 308.

After swapping the arrays 321-1, 321-2, the array 321-1 can be utilized to decode a codeword utilizing the MUXs 322-1, 322-4, 322-8, the de-MUX 322-6, the shift circuitry 323-2, and decision engine 325 of the decoding circuitry 312. The syndromes stored in the array 321-1 can be provided to the shift circuitry 323-2 utilizing the MUXs 322-1, 322-4. After updating the syndromes utilizing the decision engines 325 of the decoding circuitry 312, the updated syndromes can be provided to the MUX 322-8 of the syndrome calculation circuitry 308. The MUX 322-8 can provide the output of an XOR gate of the decoding circuitry 312 or an output of an XOR gate of the syndrome calculation circuitry 308 to the de-MUX 322-6. The MUX 322-8 can be utilized to provide the updated syndrome to the de-MUX 322-6 instead of providing the updated syndromes to the de-MUX 322-5 of the decoding circuitry 312 utilizing the MUX 322-7. The updated syndromes can be stored in the array 321-1 and not the array 321-2.

After swapping the arrays 321-1, 321-2, the array 321-2 can be utilized to calculate the next syndromes utilizing the MUXs 322-3, 322-2, 322-7, the de-MUX 322-5, and the shift circuitry 323-1 of the syndrome calculation circuitry 308. For example, the codeword can be intercepted as it is stored in the memory 320 and can be stored in the array 321-2. The array 321-2 can provide data to the shift circuitry 323-1 of the syndrome calculation circuitry 308 utilizing the MUXs 322-3, 322-2. The array 321-2 can receive data from the shift circuitry 323-1 of the syndrome calculation circuitry 308 utilizing the MUX 322-7 and the de-MUX 322-5 of the decoding circuitry 312. After the next syndromes are calculated by the syndrome calculation circuitry 308 using the array 321-2 and the codeword is decoded by the decoding circuitry 312 using the array 321-1, the syndrome calculation circuitry 308 and the decoding circuitry 312 can again swap the arrays 321-1, 321-2. Swapping the arrays 321-1, 321-2 allows the syndrome calculation circuitry 308 to calculate syndromes and the decoding circuitry 312 to decode a codeword concurrently without incurring the additional cost of copying the syndromes from one array to another (e.g., copying the syndromes from the array 312-1 to the array 321-2).

The examples provided herein are given for swapping arrays between the syndrome calculation circuitry 308 and the decoding circuitry 312 without swapping other portions of the syndrome calculation circuitry 308 and the decoding circuitry 312. In various examples, portions of the syndrome calculation circuitry 308 and the decoding circuitry 312, including the arrays 321-1, 321-2, can also be swapped. For example, the shift circuitry 323-1, 323-2 and/or the XOR gates of the syndrome calculation circuitry 308 and the decoding circuitry 312 can be swapped, among other portions of the syndrome calculation circuitry 308 and the decoding circuitry 312 that can be swapped.

In other examples, entire channels of the syndrome calculation circuitry 308 and the decoding circuitry 312 can be swapped. The channels of the syndrome calculation circuitry 308 and the channels of the decoding circuitry 312 can be copies of each other to enable the channels to be swapped. For example, the channels of the syndrome calculation circuitry 308 can include a decision engine (e.g., not shown) to enable the channels of the syndrome calculation circuitry 308 and the decoding circuitry 312 to be swapped. Swapping channels can include swapping MUXs, de-MUXs, shift circuitry, decision engines, and XOR gates, among other portions of the channels not shown.

Although non-limiting examples herein are generally described in terms of applicability to memory sub-systems and/or to memory devices, embodiments are not so limited, and aspects of the present disclosure can be applied as well to a system-on-a-chip, computing system/sub-system, data collection and processing, storage, networking, communication, power, artificial intelligence, control, telemetry, sensing and monitoring, digital entertainment and other types of system/sub-system and/or devices. Accordingly, aspects of the present disclosure can be applied to these components in order to process data where the processing of the data includes calculating one or more variables used to process the data, as described herein.

The examples described herein can be applicable to different algorithms unrelated to decoding. The examples described herein can be applicable to the processing of data where the processing of the data includes calculating one or more variables used to process the data. For instance, a counter can be calculated prior to being utilized to process data. The count can be generated (initialized) prior to being utilized to processing the data. In various instances, the processing device can utilize variables to encode a message. The variables can be initialized prior to the processing device utilizing the variables to encode a message utilizing the circuitry described herein.

The examples described herein are applicable to various types of memory and/or storage devices. For example, variables (e.g., matrices) can be generated and/or calculated by a first circuitry and can be provided to a second circuitry for processing data utilizing the variables concurrently with the second circuitry processing data utilizing different variables. The variables calculated can be stored in memory, register, arrays, storage devices, and/or files of any type and can be copied to different memory, registers, arrays, storage devices, and/or files of any time. In various instances, the array that stores the syndromes of the syndrome calculation circuitry and the array that stores the syndromes of the decoding circuitry can be of a same type of memory or different types of memory. For example, the syndrome calculation circuitry can utilize an array to store the syndromes while the decoding circuitry utilizes registers to store the syndrome calculation circuitry.

Although the examples described herein are given in the context of hardware circuitry, syndromes can be calculated concurrently with the decoding of codewords utilizing computer readable instructions. In various instances, the calculation of the syndromes can be performed in a first device concurrently with the decoding of a codeword in a different device. For example, the first device can be a host while the memory sub-system is a different device.

In various instances, the examples described herein are applicable for concurrently calculating variable and utilizing the variables to process data in the areas of decoding, encoding, telemetry, performance counters use, timing/scheduling counters use, quality of service (QOS), and/or priority and arbitration counter use. The examples described herein are also applicable for calculating variables and utilizing the variables to process data in the areas of matrix operations, encryption, decryption, scrambling, and/or interrupt maps, etc.

FIG. 4 is a flow diagram corresponding to a method 480 for calculating a syndrome in accordance with some embodiments of the present disclosure. The method 480 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 480 is performed by the syndrome calculation circuitry 108 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

The method 480 includes calculating syndromes. As described above, the syndromes can be calculated concurrently with the decoding of a corresponding codeword. Data can be stored in a first array of memory cells. The first array of memory cells can be part of a syndrome calculation circuitry. At 481, a plurality of syndromes can be calculated utilizing the data, a first circuitry, and the first array of memory cells. The first circuitry can calculate the plurality of syndrome utilizing the data. The first circuitry can include, for example, MUX gates, de-MUX gates, shift circuitry, and XOR gates.

At 482, the plurality of syndromes can be provided to a second array of memory cells. The providing of the plurality of syndromes to the second array can allow the first array and the first circuitry to continue calculating syndromes while a second circuitry coupled to the second array decodes a codeword utilizing the plurality of syndromes. At 483, a decoding operation can be performed utilizing the plurality of syndromes, the second array of memory cells, and a second circuitry, where the first circuitry and the second circuitry are independent from each other. As used herein, a first circuitry can be independent of a second circuitry if the first circuitry and the second circuitry are implemented utilizing separate hardware components. For example, the first circuitry can include a first shift circuitry and the second circuitry includes a second shift circuitry where the first shift circuitry and the second shift circuitry are separate hardware components. The decoding operation can be performed utilizing the second circuitry.

The plurality of syndromes can be calculated utilizing a codeword, the first circuitry, and the first array of memory cells. The data can be a codeword. The first circuitry can perform multiple iterations to calculate the syndromes. After each iteration, the results of the calculations can be stored in the first array of memory cells until the syndromes are calculated. The first circuitry can also calculate the syndromes in a single iteration.

The first circuitry can comprise fewer channels than the second circuitry. For instance, the first circuitry can comprise a single channel while the second circuitry comprises multiple channels. A channel of the first circuitry can include MUX gates, de-MUX gates, shift circuitry, and XOR gates. A channel of the second circuitry can include MUX gates, de-MUX gates, shift circuitry, a decision engine, and XOR gates, among other components that are used by the decoding circuitry to decode a syndrome. In other examples, the first circuitry can comprise more channels than the second circuitry. The first circuitry and the second circuitry can also comprise a same quantity of channels.

In various instances, the first circuitry can comprise fewer shift circuitry than the second circuitry. For example, the second circuitry, having four channels, can include twenty shift circuitries while the first circuitry comprises five shift circuitries. Similarly, the first circuitry can comprise fewer MUX gates and de-MUX gates than the second circuitry. For example, the first circuitry can have a quantity of MUX gates and de-MUX gates while the second circuitry includes four times the quantity of MUX gates and de-MUX gates, in examples where the first circuitry has one channel and the second circuitry has four channels. The ratio of channels of the first circuitry to channels of the second circuitry can influence the ratio of MUX gates and de-MUX gates of the first circuitry to MUX gates and de-MUX gates of the second circuitry. The second circuitry can also include one or more decision engines among other components utilized to decide a codeword. The first circuitry does not include decision engines.

The data can be intercepted and/or received by the first circuitry prior to storing the data in a memory device as opposed to storing the data in the memory device and reading the data from the memory device. Accessing the data on the fly prior to storing the data in the memory device can be more efficient given that accessing the data on the fly does not include performing a read operation. The data can be intercepted without reading the data from the memory device.

After the first plurality of syndromes are calculated, the plurality of syndromes can be copied from the first memory array of memory cells to the second memory array of memory cells. The copying of the syndromes can be performed in parallel or sequentially. To perform the copying of the syndromes in parallel each of the bits of the syndromes can be copied to the second array of memory cells at relatively the same time. The syndromes can also be copied from the first array of memory cells to the second array of memory cells sequentially. The syndromes can be copied sequentially if portions of the bits of the syndromes are copied to the second array of memory cells before and/or after different portions of the bits of the syndromes are copied to the second array of memory cells. The syndromes can also be made available to the decoding circuitry by swapping arrays of the syndrome calculation circuitry and the decoding circuitry. Swapping the arrays can allow for the syndromes to be made available to the decoding circuitry without copying the syndromes from the syndrome calculation circuitry to the decoding circuitry.

In various examples, a first array of memory cells can store a first plurality of syndromes. The first array can be part of a syndrome calculation circuitry. A first circuitry can be coupled to the first array of memory cells. The first circuitry can calculate the first plurality of syndromes utilizing the first array of memory cells concurrently with a performance of a first decoding operation. A second circuitry can perform the first decoding operation.

A second array of memory cells can receive the first plurality of syndromes from the first array of memory cells. The second array of memory cells can receive the first plurality of syndromes after the first circuitry is done calculating the first plurality of syndromes. The second array can store the first plurality of syndromes.

A second circuitry can be coupled to the second array of memory cells. The second circuitry can perform the first decoding operation utilizing a second plurality of syndromes. The second plurality of syndromes can be calculated by the first circuitry prior to calculating the first plurality of syndromes. The second circuitry can receive the first plurality of syndromes from the second array of memory cells. The second circuitry can perform a second decoding operation utilizing the first plurality of syndromes and the second array of memory cells. The second decoding operation can be performed by the second circuitry concurrently with the calculation of a next plurality of syndromes by the first circuitry. At a first time, the first decoding operation can be a current decoding operation. The current decoding operation can utilize the current syndromes (e.g., the second plurality of syndromes) to decode a current codeword. The current decoding operation can be performed concurrently with the calculation of the first plurality of syndromes. The first plurality of syndromes, at the first time, can be the next plurality of syndromes. At a second time, the first plurality of syndromes can be the current syndromes and a second decoding operation can be the current decoding operation. The second decoding operation can utilize the first plurality of syndromes to decode a current codeword. The next codeword at the first time can become the current codeword the second time. At the second time, the second plurality of syndromes can be the next plurality of syndromes which are calculated concurrently with the performance of the second decoding operation.

The first circuitry can calculate the first plurality of syndromes concurrently with a performance of one or more iterations of the first decoding operation. The one or more iterations can include the last iteration of the first decoding operation. The first circuitry can calculate the first plurality of syndromes concurrently with a performance of a plurality of iterations of the first decoding operation. The plurality of iterations can include a last iteration of the first decoding operation. The plurality of iterations can include a first iteration of the first decoding operation. The calculation of the first plurality of syndromes can be performed during one or more iterations of the first decoding operations. For example, the first plurality of syndromes can be calculated during a last iteration of the first decoding operations, during a plurality of iterations of the first decoding operation, and/or during a first iteration of the first decoding operation.

The first array of memory cells and the second array of memory cells can share some similarities and some differences. For example, the first circuitry can have a same quantity of channels as the second circuitry. The first quantity of memory cells of the first array can be equal to the second quantity of memory cells in the second array. The first array and the second array can be of a same size.

In various examples, the first array of memory cells can access a first codeword on the fly prior to storing the first codeword in a first memory device. The first circuitry can also calculate the first plurality of syndromes utilizing the first codeword concurrently with the performance of the first decoding operation.

The first array of memory cells is further configured to receive a second codeword prior to storing the second codeword in a second memory device. The first circuitry can calculate a third plurality of syndromes utilizing the second codeword concurrently with the performance of the second decoding operations.

In various examples, a first array of memory cells can store a plurality of syndromes. First circuitry can be coupled to the first array of memory cells and can calculate the plurality of syndromes utilizing the first array of memory cells concurrently with a performance of a first decoding operation.

Second circuitry coupled to the first array of memory cells can perform a second decoding operation utilizing the plurality of syndromes received from the first array. The first circuitry and the second circuitry can swap the first array of memory cells and a second array of memory cells.

The second circuitry can determine whether a quantity of errors for at least one syndrome of the plurality of syndromes is greater than a threshold quantity of errors. Responsive to determining that the quantity of errors is greater than the threshold quantity of errors, the second circuitry can provide the plurality of syndromes to a decoding circuitry. The decoding circuitry can be a different decoding circuitry than the second circuitry. Responsive to determining that the quantity of errors is equal to zero, the second circuitry can mark the codeword as being decoded. The second circuitry can also, responsive to determining that the quantity of errors is greater than the threshold quantity of errors, provide the plurality of syndromes to the decoding circuitry comprising a second array of memory cells.

The second circuitry is further coupled to a second array of memory cells and is further configured to perform the first decoding operation utilizing different syndromes received from the second array of memory cells. The first circuitry can also be coupled to the first array of memory cells and the second array of memory cells. The first circuitry can utilize the first array of memory cells to decode the syndromes and can utilize the second array of memory cells to decode the different syndromes.

At some point, the decoding circuitry can refrain from further decoding the codeword due to the decoding of the codeword taking too much time. For example, after a predetermined number of iterations, the decoding circuitry can stop decoding the codeword. The decoding circuitry can provide the codeword to a different decoder more suited for decoding the codeword. In various instances, responsive to determining that the quantity of errors is greater than the threshold quantity of errors, refrain from providing the plurality of syndromes to a decoding circuitry comprising a second array of memory cells. Responsive to determining that the quantity of errors is greater than the threshold quantity of errors, refrain from providing the plurality of syndromes and instead provide the plurality of syndromes to a different decoding circuitry comprising a third array of memory cells. The different decoding circuitry can be more complex than the decoding circuitry and can resolve a greater number of errors of the codeword. Responsive to determining that the quantity of errors is not greater than the threshold quantity of errors, the first array can provide the plurality of syndromes to the decoding circuitry comprising the second array of memory cells.

Figure 5:
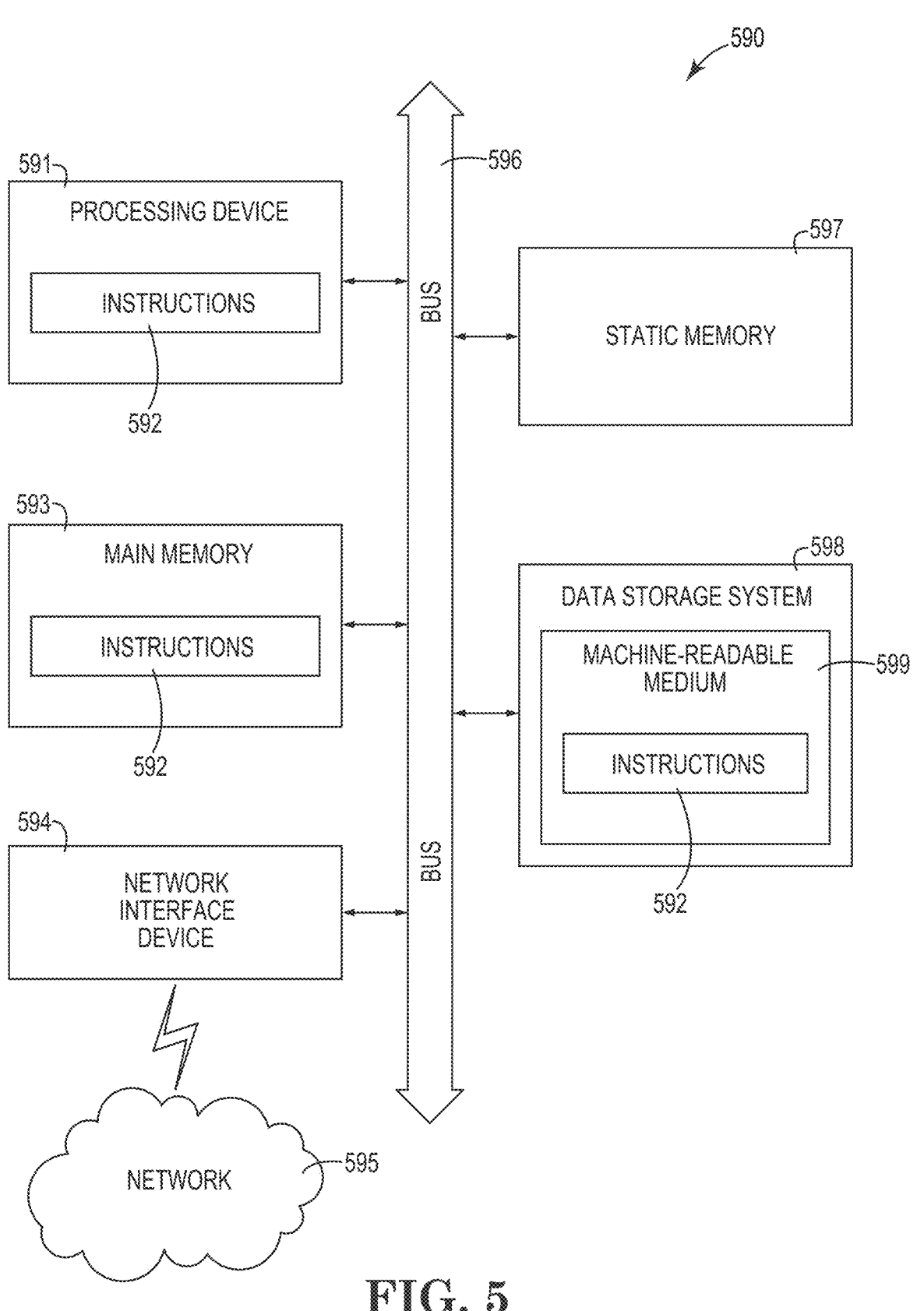
FIG. 5 is a block diagram of an example computer system in which embodiments of the present disclosure may operate.

FIG. 5 is a block diagram of an example computer system in which embodiments of the present disclosure may operate. For example, FIG. 5 illustrates an example machine of a computer system 590 within which a set of instructions, for causing the machine to perform any one or more of the methodologies discussed herein, can be executed. In some embodiments, the computer system 590 can correspond to a host system (e.g., the host system 102 of FIG. 1) that includes, is coupled to, or utilizes a memory sub-system (e.g., the memory sub-system 103 of FIG. 1) or can be used to perform the operations of a controller (e.g., to execute an operating system to perform operations corresponding to the syndrome calculation circuitry 108 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 590 includes a processing device 591, a main memory 593 (e.g., read-only memory (ROM), flash memory, dynamic random access memory (DRAM) such as synchronous DRAM (SDRAM) or Rambus DRAM (RDRAM), etc.), a static memory 597 (e.g., flash memory, static random access memory (SRAM), etc.), and a data storage system 598, which communicate with each other via a bus 596.

The processing device 591 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 591 can also be one or more special-purpose processing devices such as an application specific integrated circuit (ASIC), a field programmable gate array (FPGA), a digital signal processor (DSP), network processor, or the like. The processing device 591 is configured to execute instructions 592 for performing the operations and steps discussed herein. The computer system 590 can further include a network interface device 594 to communicate over the network 595.

The data storage system 598 can include a machine-readable storage medium 599 (also known as a computer-readable medium) on which is stored one or more sets of instructions 592 or software embodying any one or more of the methodologies or functions described herein. The instructions 592 can also reside, completely or at least partially, within the main memory 593 and/or within the processing device 591 during execution thereof by the computer system 590, the main memory 593 and the processing device 591 also constituting machine-readable storage media. The machine-readable storage medium 599, data storage system 598, and/or main memory 593 can correspond to the memory sub-system 103 of FIG. 1.

In one embodiment, the instructions 592 include instructions to implement functionality corresponding to syndrome calculation circuitry (e.g., the syndrome calculation circuitry 108 of FIG. 1). While the machine-readable storage medium 599 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
    performing, by a second circuitry, a first decoding operation utilizing a second plurality of syndromes and a plurality of decision engines;
    calculating a first plurality of syndromes utilizing a data, a first circuitry, and a first array of memory cells wherein the first circuitry does not include a decision engine;
    providing the first plurality of syndromes to a second array of memory cells;
    receiving, by the second circuitry, the first plurality of syndromes from the second array of memory cells; and
    performing a second decoding operation utilizing the first plurality of syndromes, the second array of memory cells, the second circuitry, and the plurality of decision engines,
    wherein the first circuitry and the second circuitry are independent from each other, and
    wherein the second circuitry includes the plurality of decision engines configured to correct bit-flip errors in the first plurality of syndromes.

2. The method of claim 1, wherein the first plurality of syndromes are calculated utilizing a codeword, the first circuitry, and the first array of memory cells, wherein the data is the codeword.

3. The method of claim 1, wherein the first circuitry comprises fewer processing channels than the second circuitry.

4. The method of claim 3, wherein the first circuitry comprises fewer shift circuitry than the second circuitry.

5. The method of claim 3, wherein the first circuitry comprises fewer multiplexor (MUX) gates and de-MUX gates than the second circuitry.

6. The method of claim 1, further comprising providing the first plurality of syndromes from the first array of memory cells to the second array of memory cells in parallel.

7. The method of claim 1, further comprising providing the first plurality of syndromes from the first array of memory cells to the second array of memory cells sequentially.

8. An apparatus comprising:
    a first array of memory cells configured to store a first plurality of syndromes;
    first circuitry coupled to the first array of memory cells and configured to calculate the first plurality of syndromes utilizing the first codeword and the first array of memory cells concurrently with a performance of a first decoding operation, wherein the first circuitry does not include a decision engine; and a second array of memory cells configured to:
    receive the first plurality of syndromes from the first array of memory cells; and
    second circuitry coupled to the second array of memory cells and configured to:
    perform the first decoding operation utilizing a second plurality of syndromes, and a plurality of decision engines, wherein the plurality of decision engines are configured to correct bit-flip errors;
    receive the first plurality of syndromes from the second array of memory cells; and
    perform a second decoding operation utilizing the first plurality of syndromes, the second array of memory cells, and the plurality of decision engines.

9. The apparatus of claim 8, wherein the first circuitry is further configured to calculate the first plurality of syndromes concurrently with a performance of an iteration of the first decoding operation.

10. The apparatus of claim 8, wherein the first circuitry is further configured to calculate the first plurality of syndromes concurrently with a performance of a plurality of iterations of the first decoding operation.

11. The apparatus of claim 8, wherein the first circuitry has a same quantity of channels as the second circuitry.

12. The apparatus of claim 8, wherein the first circuitry has a different quantity of channels as the second circuitry.

13. The apparatus of claim 8, wherein a first quantity of memory cells in the first array is equal to a second quantity of memory cells in the second array.

14. The apparatus of claim 8, wherein:
    the first array of memory cells is further configured to receive a first codeword prior to storing the first codeword in a first memory device; and
    the first circuitry is further configured to calculate the first plurality of syndromes utilizing the first codeword concurrently with the performance of the first decoding operation.

15. The apparatus of claim 14, wherein:
    the first array of memory cells is further configured to receive a second codeword prior to storing the second codeword in a second memory device; and
    the first circuitry is further configured to calculate a third plurality of syndromes utilizing the second codeword concurrently with the performance of the second decoding operation.

16. An apparatus comprising:
    a first array of memory cells configured to:
    receive a first codeword prior to storing the first codeword in a memory device;
    store a plurality of syndromes;
    first circuitry coupled to the first array of memory cells and configured to calculate the plurality of syndromes utilizing the first codeword and the first array of memory cells concurrently with a performance of a first decoding operation and wherein the first circuitry does not include a decision engine;
    second circuitry coupled to the first array of memory cells and configured to:
    receive the plurality of syndromes from the first array of memory cells;
    perform a second decoding operation utilizing the plurality of syndromes received from the first array and a plurality of decision engines configured to correct bit-flip errors.

17. The apparatus of claim 16, wherein the second circuitry is further configured to:

determine whether a quantity of errors for at least one syndrome of the plurality of syndromes is greater than a threshold quantity of errors;

responsive to determining that the quantity of errors is greater than the threshold quantity of errors, provide the plurality of syndromes to a decoding circuitry; and responsive to determining that the quantity of errors is equal to zero, mark the codeword as being decoded.

18. The apparatus of claim 17, wherein the second circuitry is further configured to responsive to determining that the quantity of errors is greater than the threshold quantity of errors, provide the plurality of syndromes to the decoding circuitry comprising a second array of memory cells.

19. The apparatus of claim 16, wherein the second circuitry is further coupled to a second array of memory cells and is further configured to perform the first decoding operation utilizing different syndromes received from the second array of memory cells.

* * * * *